United States Patent [19] [11] 4,128,858
Sterling et al. [45] Dec. 5, 1978

[54] MULTIPLE FLASHLAMP SYSTEM

[75] Inventors: Vaughn C. Sterling, East Cleveland; Lewis J. Schupp, Chesterland, both of Ohio

[73] Assignee: General Electric Company, Schenectady, N.Y.

[21] Appl. No.: 567,576

[22] Filed: Apr. 14, 1975

[51] Int. Cl.[2] .......... G03B 15/02
[52] U.S. Cl. .......... 362/13; 431/362
[58] Field of Search .......... 240/1.3; 431/95; 362/13

[56] References Cited

U.S. PATENT DOCUMENTS

| | | | |
|---|---|---|---|
| 3,459,488 | 8/1969 | Schroder et al. | 431/95 |
| 3,532,931 | 10/1970 | Cote et al. | 431/95 X |
| 3,556,699 | 1/1971 | Takahashi et al. | 431/95 |
| 3,602,619 | 8/1971 | Van der Tas et al. | 431/95 |
| 3,724,991 | 4/1973 | Schupp | 431/93 |
| 3,752,636 | 8/1973 | Warninck | 431/95 |
| 3,873,261 | 3/1975 | Cote | 431/95 |
| 3,884,615 | 5/1975 | Sobieski | 431/95 |
| 3,912,442 | 10/1975 | Cote | 240/1.3 X |

*Primary Examiner*—Fred L. Braun
*Attorney, Agent, or Firm*—John F. McDevitt; Lawrence R. Kempton; Frank L. Neuhauser

[57] ABSTRACT

A multiple photoflash system is provided which employs a high voltage type flashlamp construction, including a shorting primer material. The primer material is converted to a conductive residue upon ignition of flashlamp to provide a short circuit path between spaced apart inleads of the lamp. Further series connection of the individual lamps in the flashlamp system which are operatively associated with switching devices to provide an open circuit condition upon flashing of the associated lamps permits sequential flashing. The particular primer material which enables the flashlamp system to be operated in this manner comprises a solid mixture of a combustible metal fuel and an oxidizer for the fuel such as alkaline metal chlorates and perchlorates, and which further contains particular proportions of various combustion supporting oxides.

14 Claims, 3 Drawing Figures

Fig. 1
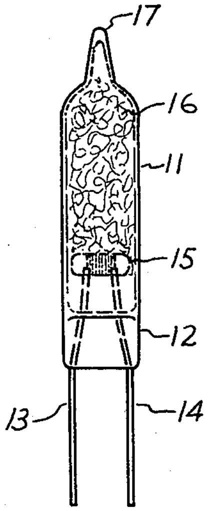
Fig. 2
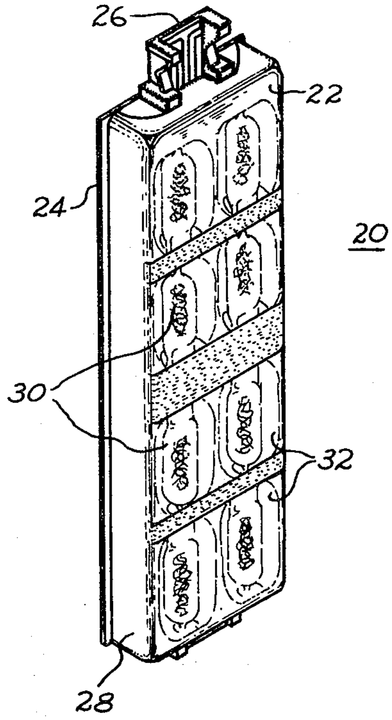
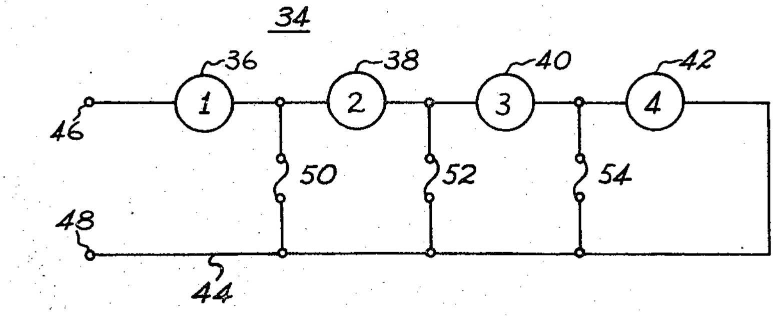
Fig. 3

MULTIPLE FLASHLAMP SYSTEM

CROSS REFERENCE TO RELATED APPLICATIONS

A related primer material composition and high voltage type flashlamp construction is disclosed in co-pending patent application, Ser. No. 508,107 filed Sept. 23, 1974 in the name of Lewis J. Schupp and assigned to the assignee of the present invention, which is now U.S. Pat. No. 3,972,673. In said high voltage lamp construction, however, the lamp desirably provides an "open circuit" condition after flashing. Co-pending patent application, Ser. No. 448,671, filed Oct. 22, 1973, now U.S. Pat. No. 3,937,946 in the name of K. H. Weber and assigned to the assignee of the present invention, further describes a multiple photoflash lamp system having connector tabs permitting insertion of the unit into the camera socket in different orientations. In said lamp system, the lamps are electrically connected to said connector tabs so that only the group of lamps relatively farthest from the lens axis will be flashed. The individual lamps in this system are also of the "open circuit" type and are arranged to operate with associated short circuiting switch devices to provide the desired firing sequence.

BACKGROUND OF THE INVENTION

The general field of the present invention is a high voltage actuated multiple flashlamp system utilizing a high voltage low energy electrical power source to ignite the flashlamps in sequence. Said multiple flashlamp system can be of the planar array type which is provided with plug-in connector tabs at each end of the unit to fit into the socket of a camera. Such flash lamp unit can be provided with an upper array of flashlamps which are electrically connected to a lower plug-in tab by means of an associated electrical circuit board so that only the upper lamps in the array will be flashed when the lower tab has been inserted into the camera socket. By turning the flashlamp unit top to bottom and reinserting the remaining tab in the camera socket, it becomes possible to flash a second group of flashlamps which are now oriented farthest away from the axis of the camera lens. This is made possible by means of a different circuit path on the associated circuitboard which electrically interconnects said lamps with the connector tab now inserted in the camera socket. The above generally described lamp sequencing arrangement eliminates or reduces the undesirable "red-eye" effect since only the lamps of the array that can flash are grouped relatively farthest from the axis of the camera lens.

The already known high voltage type flashlamps employed in such multiple flashlamp systems require a short duration pulse of approximately 1,000 or 2,000 volts at a low current value. Although the firing pulse is sometimes called a "voltage pulse", it is primarily the energy of the pulse, comprising the combination of voltage, current and time duration, that causes an individual lamp to flash when a firing pulse is applied across the spaced apart inleads of an unflashed lamp in the circuit. The firing pulse source may comprise a suitable battery-capacitor discharge and voltage step-up transformer type of circuit, or may employ a compact piezoelectric element arranged to be impacted or stressed in synchronization with opening of the camera shutter, so as to produce a firing pulse with a voltage of approximately 1,000 or 2,000 volts and of sufficient energy to fire a single flash lamp. An example of a high voltage flashlamp and a firing pulse source comprising a piezoelectric element synchronized with the camera shutter is described in U.S. Pat. Nos. 2,972,937 and 3,106,080, both to C. G. Suits.

A flashlamp construction of the all glass type that can be actuated by a high voltage pulse in the above described type multiple photoflash lamp systems further contains a combustion-supporting gas such as oxygen within a hermetically sealed glass envelope together with a loosely distributed filling of a suitable light producing combustible material such as shredded foil of zirconium, aluminum or hafnium, for example, which upon ignition produces a high intensity flash of actinic light. In typical high voltage flashlamp constructions, a fulminating type primer material is employed as a mass electrically connected directly across and between a pair of inlead wires extending into the lamp glass envelope. The primer material may be positioned and carried in the lamp on top of a glass or ceramic insulating member through which the inlead wires extend, or may be carried in a cavity provided in such a member. Ignition of said primer material responsive to the firing pulse desirably provides a sufficient blast that the inleads remain spaced apart in an open circuit condition. The known primer materials for such flashlamp constructions also desirably produce a non-conductive residue upon combustion to further help avoid establishing any low resistance shorting path between the spaced apart inleads after the lamp has been flashed.

A known primer material of this type which is disclosed in the above referenced Patent application Ser. No. 508,107 comprises a solid mixture of a combustible fuel and an oxidizer for the fuel such as alkaline metal chlorates and perchlorates, and which further contains a combustion-supporting oxide of the type which is converted to a lower oxide upon combustion of the mixture. Combustion-supporting oxides already found suitable in the primer material can be selected from the group consisting of $Co_3O_4$, $BaCrO_4$, $Fe_2O_3$, and higher oxides of nickel by reason of not converting to form a conductive residue after the primer has been ignited. In contrast thereto, other metal oxides found not suitable include CuO, PbO, $SnO_2$, $TiO_2$ and ZnO which are said to form conductive residues hence have proven unsatisfactory for an "open circuit" type lamp construction.

SUMMARY OF THE INVENTION

It has now been discovered that a particular type primer material can be employed in a high-voltage flashlamp construction so as to reliably provide short circuiting of the lamp after flashing. More particularly, a shorting primer material for a high voltage actuated flashlamp has been discovered which comprises a solid mixture containing in weight percent about 40–90% powdered combustible metal fuel, 5–15% of an oxidizer for said combustible metal fuel, 5–15% of a combustion supporting oxide which is converted to a non-conductive residue upon combustion of the mixture, and 10–20% of a combustion supporting oxide which is converted to a conductive residue upon combustion of the mixture. The operational characteristics of this primer material produces an after-flash residue remaining between the spaced apart inleads to establish a sufficient conducting path across said inleads for the shorted lamp to function thereafter as a conducting element in the flash sequencing circuit.

Briefly, the present high voltage actuated multiple flashlamp unit comprises a base, a reflector unit mounted on said base having a plurality of outwardly facing reflector cavities disposed in a matrix arrangement and facing outwardly in the same direction, a plurality of flashlamps including a first group of flashlamps and a last flashlamp mounted on said base with each one of said lamps being positioned within a respect of one said reflector cavities, and a circuitboard member operatively associated with said lamps to flash the lamps in sequence by providing a series circuit including said lamps adapted to be connected to the energy source, a low resistance switching device connected in series with each lamp of said first group across the energy source and switching to open the circuit upon flashing of its associated lamp, said flashlamps each comprising a hermetically sealed light transmitting envelope, a quantity of filament recombustible material distributed within said envelope, and flash ignition means within said envelope which includes a pair of spaced apart inleads having a mass of primer material connected between said inleads to form a conductive residue upon combustion and provide an electrical path to succeeding lamps.

BRIEF DESCRIPTION OF THE DRAWINGS

FIG. 1 is a cross-sectional view partly in elevation of a preferred high voltage flashlamp of the present invention;

FIG. 2 is a perspective view of a multiple flashlamp unit in accordance with a preferred embodiment of the invention; and FIG. 3 is a schematic electrical diagram for a multiple flashlamp system according to the present invention.

DESCRIPTION OF THE PREFERRED EMBODIMENTS

In the preferred flashlamp design of the present invention, a mount construction is employed for assembly of the inlead wires and primer material to provide the flash ignition means. Said flashlamp mount construction comprises a glass bead or other electrically-insulated member provided over an end of the pair of inlead wires. An opening is provided to the bead member between and in communication with both of the inlead wires, and primer material is provided in the opening and electrically bridges across the inlead wires. Preferably, said opening extends fully through the bead member in a direction parallel to the inlead wires. Also, preferably, a portion of the bead member extends above and overlies at least a portion of the ends of the inlead wires. The underside of the bead member may also be sleeved or shaped to provide increased electrical insulation between the inlead wires. It is also within contemplation of the present invention, however, to provide different support means for the required conductive primer residue in forming this type electrical path interconnecting the inleads.

Referring to FIG. 1, the preferred lamp construction has the same general features described in the aforementioned co-pending application Ser. No. 508,107 which comprises a tubular envelope 11 preferrably made of a borosilicate glass or other suitable light-transmitting vitreous material such as lead glass and having a stemmed press seal 12 at one end thereof through which a pair of inlead wires 13 and 14 extend from the exterior to the interior of the bulb 11 in a generally mutually parallel spaced apart manner and form part of a mount 15. The bulb 11 is partially filled, above the mount 15, with a loose mass of filamentry or shredded metal foil or wire 16, of zirconium or hafnium, or other suitable combustible metal. Air is exhausted from the bulb 11, and the bulb is filled with oxygen at a pressure of at least several atmospheres, such as about 5 to 10 atmospheres or greater and the bulb is sealed off at an exhaust tip 17 at the other end thereof from the stem press seal 12. The lamp may be coated with the usual lacquer or plastic protective coating.

To further enhance the reliability of afterflash electrical shorting in the flashlamp, an excess quantity of the filamentry combustible material is employed with respect to the available quantity of combustion supporting atmosphere beyond that necessary for a stoichiometric combustion reaction to take place. Thus, while it has proven generally desirable to maintain an excess stoichiometric ratio between oxygen and the combustible metal foil in the already known "open circuit" type lamp constructions previously mentioned, it is desirable for the present shorting type lamp construction to reduce said stoichiometric ratio to about 90%–100% for enhanced shorting reliability. This can be accomplished simply by increasing the weight of the combustible metal foil in the lamp while maintaining the oxygen pressure at the conventional levels already employed.

As further described in the aforementioned copending application Ser. No. 508,107, the preferred mount construction can take the form of a glass bead shaped to form a pocket for containment of the afterflash conductive primer residue between the spaced apart inlead wires 13 and 14. Thus, the glass bead can be sealed over and around an end of said inlead wires and be provided with an opening which is located between and in communication with both of the inlead wires. The glass bead may be formed by placing a ring of glass around the ends of the inlead wires and heating for a suitable time and at suitable temperature so as to cause the glass ring to shrink into molten contact with the open portion of the inlead wires, leaving a slot-like or other shape opening which preferably extends fully through the electrically insulative member in a direction parallel to the inlead wires. As shown, the opening is at least partially filled with a solid mixture of the primer material which can be deposited in the opening by various known means such as with a syringe, or by daubing, or by dipping the inverted mount member in a liquid primer slurry. The small cross-sectional area of the opening and the opening being open at both ends causes a capillary action effect which aids in drawing the liquid primer slurry into the opening.

The present primer material providing the desired short circuited condition in the lamp upon flashing comprises a solid mixture containing in weight percent about 40–90% powdered combustible metal fuel, 5–15% of an oxidizer for said combustible metal fuel, 5–15% of a combustion supporting oxide which is converted to a non-conductive residue upon combustion of the mixture, and 10–20% of a combustion supporting oxide which is converted to a conductive residue upon combustion of the mixture. In said primer material, the afterflash shorting condition is believed attributable to using combustion supporting oxides which when reduced by loss of oxygen become conductive oxides or are converted to the metallic state along with using excess ratios of the combustible metal fuel with respect to the oxidizer constituents beyond that necessary for the stoichiometric combustion reaction to take place.

By reason of the latter feature, not all of the metal fuel constituent is reacted upon ignition of the primer material and the afterflash residue can be in the form of a slag containing the partly reacted metal powder which may have become partially converted to a conductive metal oxide. As still further described in said copending application Ser. No. 508,107, the preferred primer material can include conventional amounts of various polymer binders to produce an adhesive mass of the deposited solid primer.

The electrical characteristics of the afterflash primer residue in providing a conductive path are significant since they differ considerably from the conductivity that would result if the metal inleads were directly short circuited by physical contact therebetween. More particularly, direct physical contact between said inleads would provide an absolute short circuit path having only a few ohms resistance value whereas the afterflash resistance of the primer connected inleads can be as high as 10,000 ohms and still provide the necessary conductive path in the present flashlamp system. Even if the electrical resistance of the primer residue exceeds this value it would still be possible to provide an electrical path thereafter between the spaced apart inleads with application of a successive firing pulse since the applied voltage levels range from approximately 1,000 volts to as high as 2,500 volts or greater. The desired conductive path can be maintained with a successive firing pulse at these applied voltage levels by maintaining a breakdown voltage level of around 200 volts for the primer residue as deposited in the spaced apart leads. A satisfactory conductive path would still result although physical discontinuities in the primer residue or other abnormalities produce an electrical resistance across the spaced apart inleads exceeding 10,000 ohms.

The fuel in the present primer material is a powdered combustible incandescible metal such as zirconium, hafnium, titanium, thorium, aluminum, magnesium, boron, silicon or other alloys which upon ignition by the high voltage firing pulse ignites the filamentary combustible material. Suitable oxidizers for the combustible metal fuel include alkali metal and alkaline earth metal chlorates, as well as perchlorates including sodium perchlorate, potassium perchlorate, barium chlorate, sodium chlorate, and potassium chlorate. As has been previously pointed out, the above defined proportions for the fuel and oxidizing constituents in the present primer material are controlled to provide reliable ignition with incomplete combustion of the fuel constituent which further leads to a low-blast characteristic for greater retention of primer residue between the inlead wires after the lamp has been flashed. Useful combustion supporting oxides in the primer material which are converted to a non-conductive residue upon combustion of the mixture can be selected from the group consisting of $Co_3O_4$, $BaCrO_4$, $Fe_3O_4$ and higher oxides and nickel while the combustion supporting oxides which are converted to a conductive residue upon combustion of the mixture include $CuO$, $PbO_2$, $SnO_2$ and $ZnO$. $BaCrO_4$ has been found to be a particularly useful combustion supporting oxide in the primer mixture in providing the desired afterflash characteristics through disassociation into its $BaO$ and $Cr_2O_3$ constituents.

Referring to FIG. 2, there is illustrated a preferred linear or planar type multiple flashlamp unit of the present invention which is provided with plug-in connector tabs at each end of the unit to fit into the socket of the camera (not shown). Said lamp array is provided with an upper group of flashlamps which are electrically connected to the lower plug-in tab by means of an associated electrical circuitboard so that only the upper lamps in the array will be flashed when the lower tab has been inserted in the camera socket. By turning the flash unit top to bottom and inserting the remaining tab into the camera socket it becomes possible to flash a second group of flashlamps which are now oriented farthest away from the axis of the camera lens. This is made possible by means of a different circuit path on the associated circuitboard which electrically interconnects said lamps with the connector tab now inserted in the camera socket. Said planar type multiple flashlamp unit 20 is of the same general type described in the above cross-referenced co-pending Weber application. Accordingly, said flashlamp unit generally comprises a reflector unit 22 mounted upon an elongated molded plastic base supporting member 24 which further supports an electrical circuitboard member 26 along with transparent cover means 28 which is secured to said base as shown. The individual reflector cavities of said reflector unit are suitably provided with a specular reflective coating of a suitable metal such as aluminum, as by well-known metal vaporisation vacuum deposition processes or other suitable techniques. Individual flashlamps 30 are mounted within respective reflector cavities 32 also as shown to rest upon the baseboard member 24. The electrically fired flashlamps of said unit are electrically connected to the circuitboard member 26 so that the unit can be plugged into a camera socket in different orientations whereby only a group of said lamps relatively furthest away from the camera lens axis will be flashed so as to reduce the likelihood of the undesirable "red-eye" effect previously mentioned. The detail features of said electrical connections are disclosed in the above cross-referenced Weber application, hence need only be further defined herein as relates to the series circuit connection between said lamps which further includes connection of the switching devices to provide a particular open circuit condition with respect to operatively associated flashlamps. The cover member 28 physically interlocks with the base supporting member 24 so as to contain the circuitboard member 26 having a plurality of flashlamps 30 attached thereto.

Referring to FIG. 3, a schematic electrical diagram 34 is shown which represents the particular circuit configuration being employed for one group of four lamps in the above flashlamp unit. Accordingly, lamps 36, 38, 40 and 42 are serially connected in the circuit 44 to have the high-voltage low energy firing pulse applied across the inlead terminals 46 and 48 of the circuit from a suitable electrical energy source which can be located in a camera (not shown). As further shown in said diagram, the above described shorting lamps are operatively associated with low resistance type switching devices 50, 52 and 54 which are connected in series with flashlamps 36, 38 and 40, respectively, to avoid short circuiting of the energy source when successive lamps are flashed in the firing sequence. The desired result is accomplished when the switching devices successively produce an open circuit condition in the branch circuits of the first group of flashlamps 36–40 and it should be noted that the last flashlamp 42 in the series does not have a corresponding switching device connected across the energy source.

Low resistance switching devices are employed in the circuit to produce a minor voltage drop when the firing pulse is applied across an unflashed lamp so that a major portion of the available energy serves to ignite the flashlamp in accordance with voltage division considerations. The particular electrical characteristics for suitable switching devices in the above described circuit are also significant since these devices can be actuated in different ways when the associated flashlamps are ignited. More particularly, locating said switching devices adjacent to the flashlamps permits receipt of radiant energy therefrom in the form of light and heat when the lamps are ignited. This can be accomplished with a switching material being deposited on the circuitboard between a pair of terminals in the electrical circuit. Upon actuation by the radiant energy when the adjacent flashlamp is ignited produces a physical alteration in the switch material to provide the desired open circuit condition between said electrical terminals. Thermally fusable metals can be employed in this manner as well as combustible materials exhibiting electrical resistance less than around 1000 ohms before the switch opens and the desired protection of the energy source is accomplished when the open switches have a resistance greater than about 1,000,000 ohms. It is further desirable for the switch material in the foregoing type switch device to exhibit a relatively low breakdown voltage so that a firing pulse can be applied across the associated flashlamp in the event that the switch material does not make good electrical contact with the electrical terminals. Thus, a firing pulse can still be applied across the unflashed lamp, at the previously mentioned applied voltage levles when an unopened switch exhibits a breakdown voltage level of around 200 volts or less. On the other hand, a breakdown voltage level of at least around 2000 volts is required for an open switch to provide the desired protection in a circuit employing flashlamps having after-flash electrical characteristics as hereinbefore reported. From a comparison of these after-flash breakdown voltage and resistance characteristics in the associated flashlamps and switching devices it can also be seen that both values are desirably maintained at much higher levels in the switching devices.

It will be apparent from the foregoing description that various other embodiments and modifications of the present invention will be apparent to persons skilled in the art. For example, the invention can also be embodied in planar type multiple flashlamp units having a different number of lamps than herein specifically disclosed and to even include a unit having a group of lamps and reflectors arranged to illuminate in one direction with another group of lamps and reflectors being arranged to illuminate in the opposite direction. Still further modifications of the particular circuit configuration are contemplated such as that described in connection with FIG. 3 of the U.S. Pat. No. 3,532,931 which is assigned to the assignee of the present invention. It is intended, therefore, to limit the present invention only by the scope of the following claims.

We claim:

1. A high-voltage activated flashlamp comprising a hermetically sealed light-transmitting envelope, a quantity of filamentary combustible material distributed within said envelope, and flash ignition means within said envelope in the form of a pair of inleads spaced apart with an electrically insulative member and having a mass of primer material connected between said inleads which ignites responsive to application of a high voltage pulse thereto and forms a conductive residue upon combustion to provide an electrical path interconnecting said inleads, said primer having combustible metal fuel and oxidizer constituents in a ratio of excess combustible metal fuel to oxidizer constituents beyond that necessary for the stoichiometric combustion reaction to take place.

2. A high-voltage flashlamp as in claim 1 wherein the mass of primer material is adhesively bonded together with a polymer binder.

3. A high-voltage flashlamp as in claim 1 wherein the inleads are spaced apart with a glass bead.

4. A high-voltage flashlamp as in claim 1 wherein the electrically insulative member is disposed over one end of the pair of inlead wires and contains an opening in communication with both of said inlead wires containing the primer material.

5. A high-voltage flashlamp as in claim 4 wherein the opening extends fully through the electrically insulative member in a direction parallel to the inlead wires.

6. A high-voltage flashlamp as in claim 5 wherein the electrically insulative member extends above and overlies at least a portion of the ends of the inlead wires.

7. A high-voltage activated multiple flashlamp system utilizing a high-voltage low-energy electrical source to ignite the flashlamps in combination with a planar type multiple flashlamp unit comprising a base, a reflector unit mounted on said base having a plurality of outwardly facing reflector cavities disposed in a matrix arrangement and facing outwardly, a plurality of groups of flashlamps, each of said groups including a first group of flashlamps and a last flashlamp connected in series mounted on said base with each one of said lamps being positioned within a respective one of said reflector cavities and a circuitboard member operatively associated with said lamps to flash the lamps in sequence by providing a series circuit including said lamps adapted to be connected to the energy source, a low resistance switching device connected in series with each lamp of said first group across the energy source and switching to open the circuit upon firing of its associated lamp, said flashlamps each comprising a hermetically sealed lighttransmitting envelope, a quantity of filamentary combustible material distributed within said envelope, and flash ignition means within said envelope in the form of a pair of inleads spaced apart with an electrically insulative member and having a mass of primer material connected between said inleads which ignite responsive to application of a high voltage firing pulse thereto and form a conductive residue upon combustion and provide an electrical path to succeeding lamps, said primer material having combustible metal fuel and oxidizer constituents in a ratio of excess combustible metal fuel to oxidizer constituents beyond that necessary for the stoichiometric combustion reaction to take place.

8. A flashlamp system as in claim 7 wherein each switching device is located adjacent one of said lamps and disposed to receive radiant energy emitted by the lamp.

9. A flashlamp system as in claim 7 wherein each switching device is voltage responsive and connected to form a shunt path across said lamps.

10. A flashlamp system as in claim 7 having lamps wherein the mass of primer material is adhesively bonded together with a polymer binder.

11. A flashlamp system as in claim 7 wherein the inleads are spaced apart with a glass bead.

12. A flashlamp system as in claim 7 wherein the electrically insulative member is disposed over one end of the pair of inlead wires and contains an opening in communication with both of said inlead wires containing the primer material.

13. A flashlamp system as in claim 12 wherein the electrically insulative member extends above and overlies at least a portion of the ends of the inlead wires.

14. A flashlamp system as in claim 7 wherein all lamps are arranged to illuminate in the same direction when flashed and a pair of plug-in connector tabs form part of the circuitboard with each of said plug-in connector tabs being connected to a different lamp group.

* * * * *